United States Patent [19]

McGregor

[11] Patent Number: 4,749,477
[45] Date of Patent: Jun. 7, 1988

[54] PORTABLE SWIMMING POOL FILTER

[76] Inventor: Duncan C. McGregor, 29 Scott Street, Scottburgh, Natal Province, South Africa

[21] Appl. No.: 36,321

[22] Filed: Apr. 9, 1987

[30] Foreign Application Priority Data

Apr. 11, 1986 [ZA] South Africa ............ 86/2729
Jul. 29, 1986 [ZA] South Africa ............ 86/5670
Dec. 19, 1986 [ZA] South Africa ............ 86/9578

[51] Int. Cl.⁴ ............................................. E04H 3/20
[52] U.S. Cl. ........................ 210/169; 210/416.2; 4/496; 4/509
[58] Field of Search ............ 4/494, 496, 507, 509; 210/169, 416.2

[56] References Cited

U.S. PATENT DOCUMENTS

| | | | |
|---|---|---|---|
| 2,979,206 | 4/1961 | Konopka et al. | 210/169 |
| 2,979,733 | 4/1961 | Saint Clair et al. | 210/169 |
| 2,980,256 | 4/1961 | Nash | 210/169 |
| 3,036,712 | 5/1962 | Barbara | 210/169 |
| 3,169,920 | 2/1965 | Payne | 210/169 |
| 3,348,686 | 10/1967 | Spitzer | 210/169 |
| 3,372,809 | 3/1968 | Spitzer | 210/169 |
| 3,820,173 | 6/1974 | Weller | 210/169 |
| 3,864,262 | 2/1975 | Lang et al. | 210/169 |
| 4,087,870 | 5/1978 | Palmer, Jr. | 4/171 |
| 4,193,143 | 3/1980 | DeCarvalho Vianna | 4/496 |
| 4,278,247 | 7/1981 | Joppe et al. | 4/494 |
| 4,285,813 | 8/1981 | Stewart et al. | 210/416.2 |
| 4,490,250 | 12/1984 | Dockery | 210/169 |
| 4,589,982 | 5/1986 | Willinger | 210/416.2 |
| 4,652,369 | 3/1987 | De Polo et al. | 210/169 |

FOREIGN PATENT DOCUMENTS

| | | |
|---|---|---|
| 2751114 | 7/1978 | Fed. Rep. of Germany ...... 210/169 |
| 2365014 | 4/1978 | France . |
| 2487215 | 1/1982 | France . |
| 2492438 | 4/1982 | France . |
| 68/7968 | 6/1969 | South Africa . |
| 84/8780 | 5/1985 | South Africa . |
| 85/1614 | 9/1985 | South Africa . |
| 1531940 | 11/1978 | United Kingdom . |
| 1565607 | 4/1980 | United Kingdom . |
| 2066688 | 7/1981 | United Kingdom . |
| 1595845 | 8/1981 | United Kingdom . |
| 1595846 | 8/1981 | United Kingdom . |

Primary Examiner—Benoit Castel
Attorney, Agent, or Firm—Bernard, Rothwell & Brown

[57] ABSTRACT

A filter includes a portable housing having upper and lower parts. A pump is mounted on the upper part. The lower part contains a filter unit operatively connected to the delivery of the pump, has an inlet opening for the pump suction, and is immersible in a body of liquid requiring filtration. Advantageously the upper part contains a drive motor for the pump and has mounting means for mounting on the edge of a swimming pool. An accessory may operatively be associated with the housing to form an openable cover. The accessory may be in the form of a table top, a diving board or a slide. The filter unit may include a plurality of filter bags connected in parallel via a delivery manifold to the pump delivery. Instead the plurality of bags may be arranged cascade fashion in series one inside another.

7 Claims, 5 Drawing Sheets

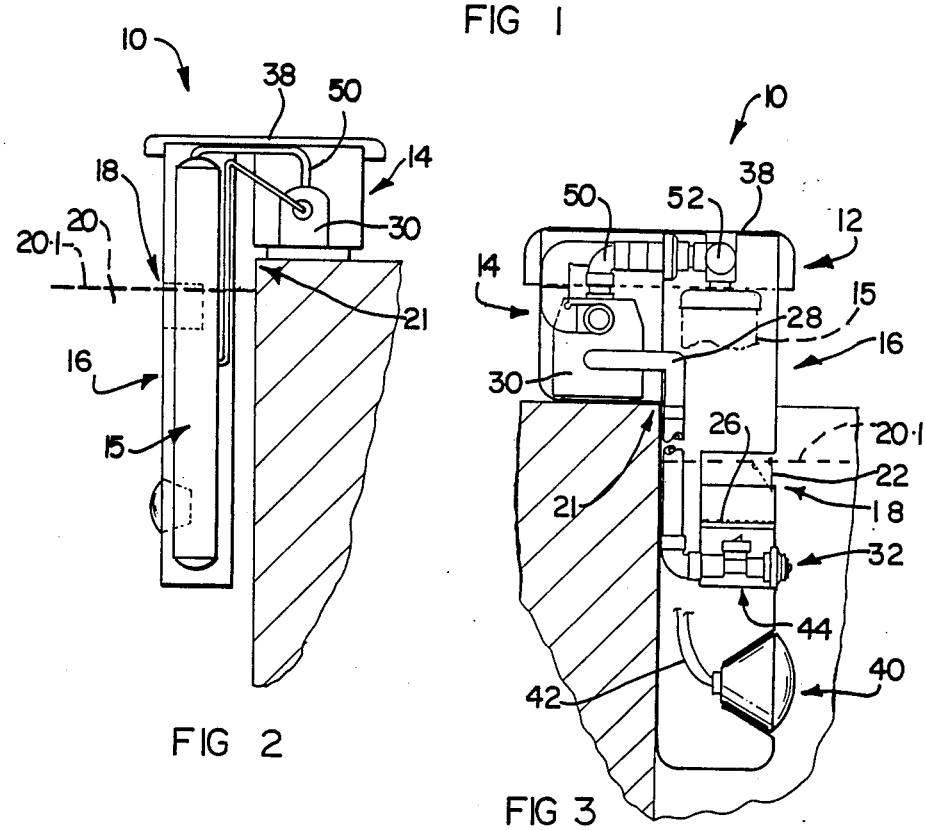

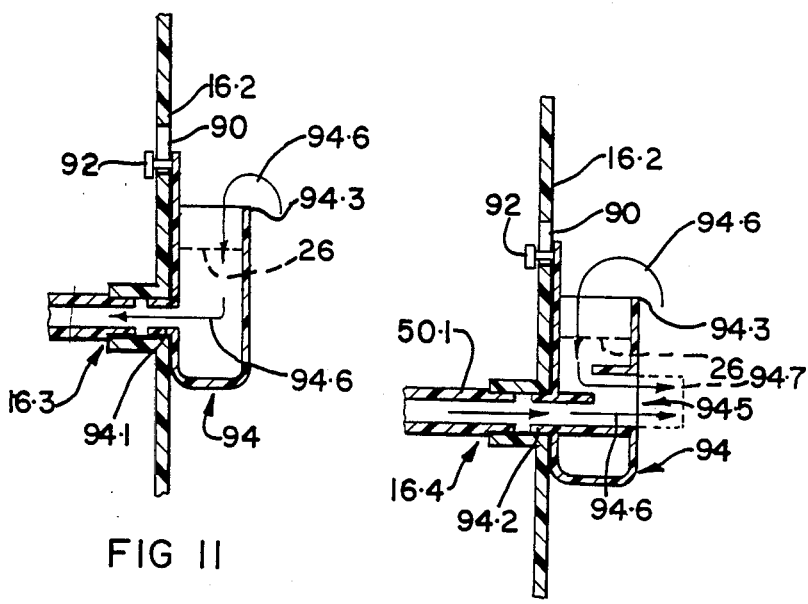
FIG 11
FIG 12
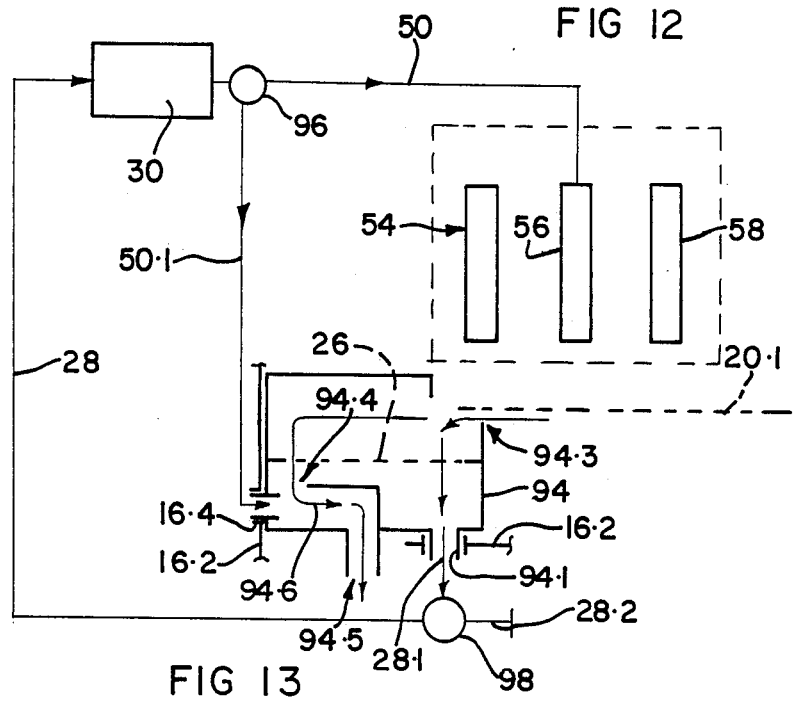
FIG 13

PORTABLE SWIMMING POOL FILTER

FIELD OF THE INVENTION

This invention relates to a filter. It relates in particular to a filter for a swiming pool.

It is an object of this invention to provide a filter which is versatile, and which is inexpensive and which can be repaired at less expense than filters known to the Applicant.

SUMMARY OF INVENTION

Accordingly the invention provides a filter which includes a portable housing having an upper part in which is mounted a pump, and a lower part which contains a filter unit operatively connected to the delivery of the pump, the lower part of the housing having an inlet opening for the pump suction and, in use, being immersible in a body of liquid requiring filtration.

The upper part may contain a motor drivingly connected to the pump, and may have mounting means for mounting it on the edge of a reservoir. The lower part of the housing may, in use, depend from the upper part, and extend downwardly into the body of liquid requiring filtration.

The upper part may have a top cover which is removable and which in use is horizontal and capable of being used as a table top.

Another embodiment of the filter may have a diving board forming a top cover for and extending over and resting on the upper part. An end of the diving board remote from the upper part, may have mounting means for mounting it pivotally, to permit the diving board in use to be pivoted to uncover the upper part.

Yet another embodiment of the filter may include a slide sloping downwardly from a high rear end to a low front end, the slide having a step-ladder portion having steps leading up to its high rear end. The low front end may form a top cover for and may extend over and rest on the upper part. The step-ladder portion may have a pivotal mounting for pivotally supporting the slide to permit it in use to be pivoted to uncover the upper part.

The filter unit may include at least one filter bag. If desired, a plurality of filter bags may be connected in parallel to a delivery manifold having its inlet connection connected to the pump delivery. Alternatively, a plurality of filter bags may be arranged cascade fashion in series one inside another, the inner bag of the series having an inlet opening connected to the delivery of the pump.

The housing may have an inlet chamber into which the housing inlet opening leads, the inlet chamber having an outlet opening connected to the pump suction. A sieve may be provided in the inlet chamber upstream from the said outlet opening out of the inlet chamber. That portion of the inlet chamber, downstream from the sieve, may have aligned flowstream openings, one of the said aligned flowstream openings being adapted in use to act as an inlet flowstream opening, and the other to act as an outlet flowstream opening. A branch delivery pipe may be provided, leading from the pump delivery to the said inlet flowstream opening of the inlet chamber. The casing may have a socket connected to the pump suction, and a socket connected to the branch delivery pipe. The inlet chamber may be detachable and may have a spigot formation at the outlet out of the inlet chamber for connection to the pump suction, and may have a spigot formation at the inlet flowstream opening for connection to the branch delivery pipe, such spigot formations in use being adapted to fit removably into the said sockets.

The inlet opening into the housing may communicate with a connection adapted for connection to a pool cleaning device.

The lower part of the housing having the inlet opening may have mounting means for mounting an underwater light.

The invention extends also to a swimming pool having a recess, to accommodate, with little clearance, the lower part of the housing of a filter as described.

The invention will now be described by way of example with reference to the accompanying diagrammatic drawings.

BRIEF DESCRIPTION OF DRAWINGS

In the drawings,

FIG. 1 shows a three-dimensional view of a filter in accordance with the invention as mounted on the edge of a swimming pool;

FIG. 2 shows a sectional side elevation corresponding to FIG. 1;

FIG. 3 shows a sectional side elevation of another embodiment, in more detail;

FIG. 11 shows a part-sectional elevation at XI—XI in FIG. 10;

FIG. 12 shows a part-sectional elevation at XII—XII in FIG. 10;

FIG. 13 shows a flow diagram of a filter installation incorporating a filter and weir in accordance with FIGS. 10 to 12 of the drawings;

DESCRIPTION OF THE PREFERRED EMBODIMENTS

Figure 4:
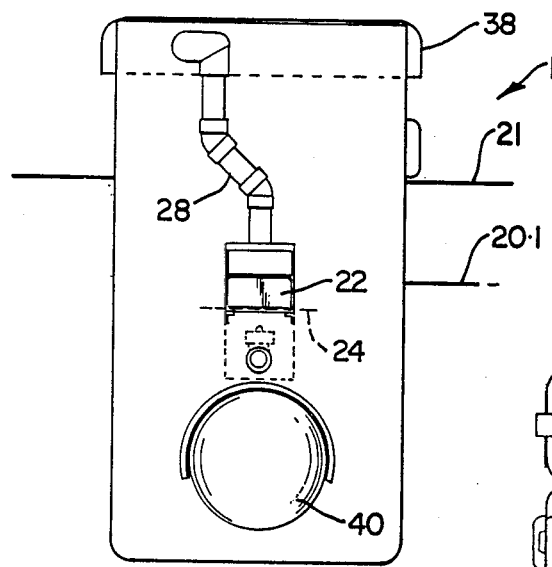
FIG. 4 shows a front elevation corresponding to FIG. 3.
Figure 6:
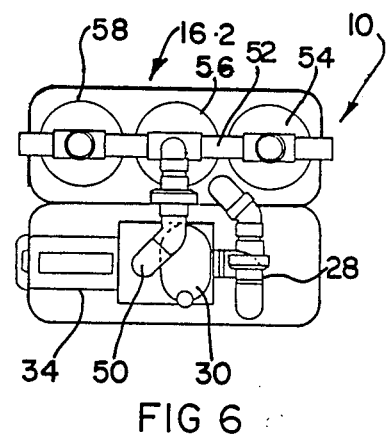
FIG. 6 shows a plan view corresponding to FIG. 5.
Figure 5:
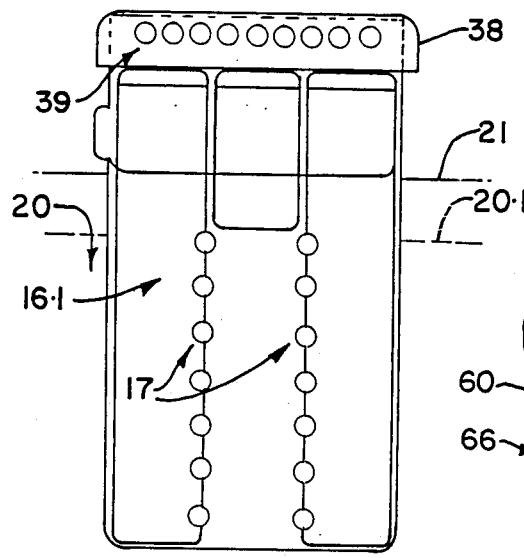
FIG. 5 shows a back view corresponding to FIG. 4.
Figure 7:
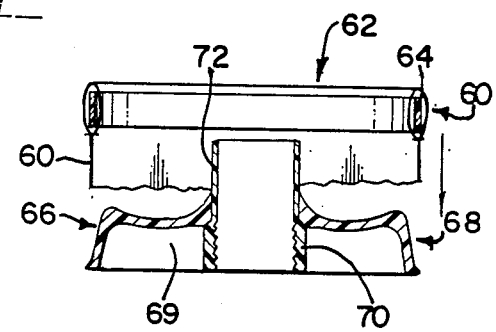
FIG. 7 shows a part-sectional elevation of a filter bag cover member with filter bag.

Referring to the drawings, reference numeral 10 refers generally to a filter in accordance with the invention. The filter includes a portable housing 12 having an upper part 14 within which is mounted a pump 30 and motor 34. A lower part 16 of the housing 12 contains a filter unit 15 operatively connected to the pump delivery and depends outboard motor fashion from the upper part 14 over the edge 21 of a reservoir or pool holding a body of liquid 20 requiring filtration. The said lower part 16 of the housing 12 has an inlet opening 18 and is immersible in the body of liquid 20. The surface 20.1 of the body of liquid 20 lies at a level, in line with the inlet opening 18. The flow through the inlet opening 18, is controlled by a buoyant weir 22 which is pivotally mounted about an axis 24.

Liquid requiring filtration passes in through the inlet opening 18 and through a sieve 26 and via suction pipe 28, into the pump 30. The suction pipe 28, has a branch connection 32 whereby a pool cleaning device may be connected to the suction pipe 28 of the pump 30. The suction piping 28 has a change-over valve 44 so that inlet flow can take place via the inlet opening 18 and via the weir 22, or via the connection 32.

Figure 14:
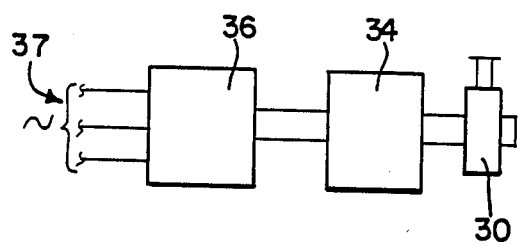
FIG. 14 shows electrical circuitry for energizing the pump motor by low voltage.

The pump 30 is drivingly connected to the motor 34, energized from a low voltage source preferably about 32 volts, and at the most 50 volts. The motor 34, may be supplied with power, from a step-down transformer 36, which is supplied from a domestic 15 amp power source 37 (see FIG. 14).

The upper part 14 of the housing, has a top cover 38 which is removable, and which in use, can provide a pool side table top. The top cover 38 has openings 39 for purposes of ventilation. The lower part 16 of the housing 12 is further provided with a lamp 40 which is itself energizable via leads 42, connected in parallel with the motor 34 to the step down transformer 36. The lower part 16 also has openings 17 to permit filtrate to pass back into the body of water 20. These openings 17 may be provided in the back wall 16.1 or the front wall 16.2 of the lower part 16. The pump has a delivery 50, which is connected to a manifold 52 which has a plurality of filter units 54, 56, and 58 connected in parallel thereto. If desired, further filter units (not shown) may be connected to the ends of the manifold 52. The filter units 54, 56, 58 each comprises a filter bag 60 having a mouth opening 62, with a flexible resilient ring 64 around the mouth opening. The unit further comprises a filter bag cover member 66 which is of inverted dished formation defining a downwardly diverging filter bag seat 68 adapted in use to seat snugly within the mouth opening 62 of the filter bag 60. The filter bag cover member includes a top cover 69 and a flow conduit 70 with a connection 72 for connection to the delivery 50 of the pump directly or indirectly via the manifold 52.

Figure 8:
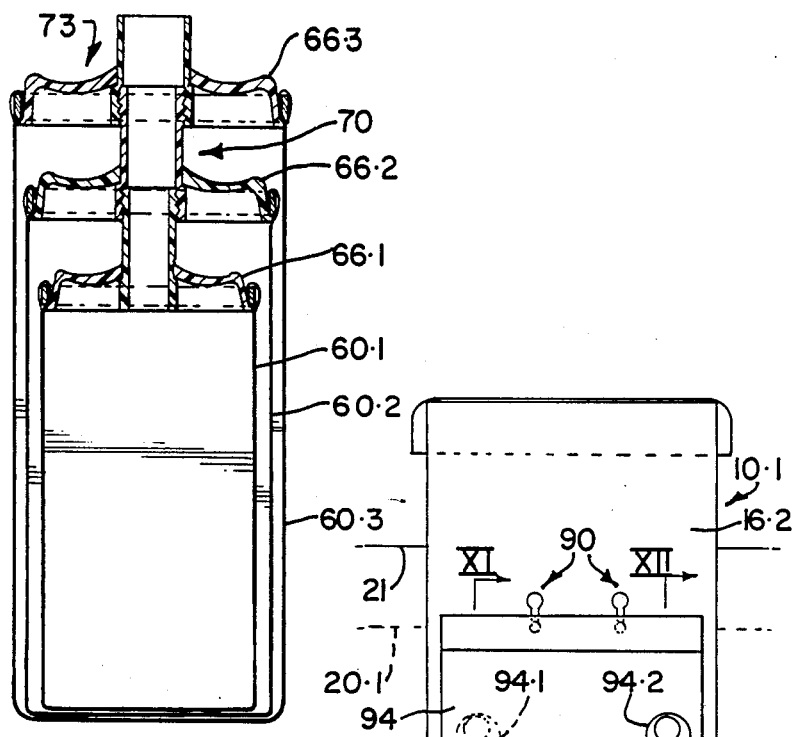
FIG. 8 shows a sectional side elevation of a composite filter unit.
Figure 10:
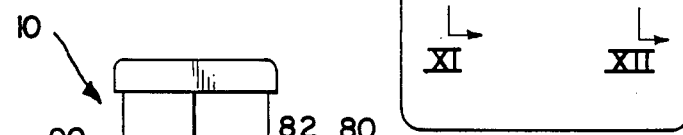
FIG. 10 shows a front elevation of an alternative embodiment of a filter in accordance with the invention, in combination with a detachable weir.

Referring now to FIG. 8 of the drawings, there is shown a composite filter unit, which includes a composite filter bag cover member 73 having a plurality of top covers 66.1, 66.2, 66.3 arranged in series around the filter unit inlet flow conduit 70. The filter bag cover members 66.1, 66.2 and 66.3 are arranged cascade fashion with their bags 60.1, 60.2 and 60.3 arranged one inside the other. Where very good filtration is required, then the bags are arranged in series as shown in FIG. 8 of the drawings.

Figure 9:
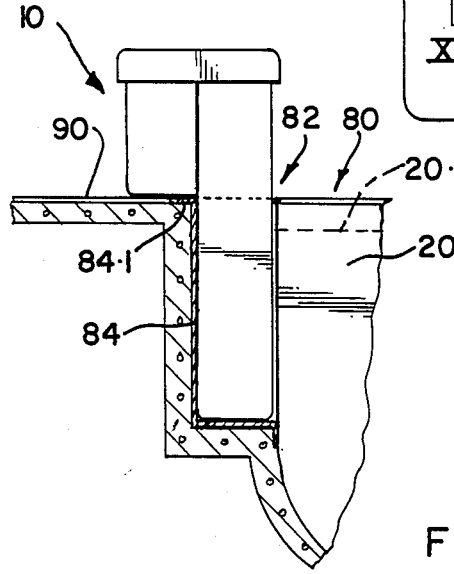
FIG. 9 shows a sectional side elevation of a pool having a recess to receive a filter in accordance with the invention.

Referring now to FIGS. 9 of the drawings, there is shown a sectional side elevation of a swimming pool 80, built specifically to have a recess 82 to accommodate a filter 10 in accordance with the invention. The recess 82 has a lining 84 in the form of a synthetic plastic moulding. The plaster 90 is worked off level with the flanges 84.1 of the synthetic plastics moulding 84. If desired, inwardly projecting flanges (not shown) may be provided to retain a filter 10 in the recess 82 to prevent it from falling out of the recess 82. Referring now to FIGS. 10 to 13, there is shown a filter 10.1 having a front wall 16.2 with openings 90 to be engaged by lugs 92 of a removable inlet chamber 94 having spigot formations 94.1 and 94.2 removably engagable with sockets 16.3 and 16.4 respectively, provided in the front wall 16.2. The socket 16.3 may also be engageable, for alternative use, by the suction hose of a pool-cleaning device (not shown) if a separate connection is not provided. The socket 16.4 is an alternative or bypass outlet 50.1 for the pump 30. By using such a bypass 50.1, increased flow of water over the weir edge 94.3 is obtainable by water being drawn ejector fashion out of the inlet chamber 94, through opening 94.4 and out of outlet 94.5. The direction of flow of water through the weir 94 is indicated by arrows 94.6. By providing a deflecting wall 94.7, it is possible to have flow of water out of outlet 94.5 in a direction parallel to the front wall 16.2. This will result in flow out of the filter taking place parallel to the pool wall, and will aid in the circulation of water in the pool.

The control of delivery flow from the pump 30 along delivery line 50 or along alternative delivery line 50.1, or the apportionment of flow along these lines, takes place by operation of valve 96. The control of flow along suction line 28 in direction 28.1 or 28.2 (from a pool-cleaning device not shown) or apportionment of flow takes place via valve 98.

If desired, an inlet chamber, such as chamber 94, may be formed integrally with or built into the lower part 16, instead of being removably attachable to part 16.

A filter in accordance with the invention has the advantage that if anything should go wrong with it, then it can be removed bodily for repair, and a replacement unit can be put in its place while the other filter is being repaired. Such a unit can also serve as a temporary filter unit to keep the filtration of water in a pool under control if a permanent filter installation is out of action for some time for repair.

It is a further advantage of this invention that the filter can be placed at any one of a number of positions around the upper edge of a pool thereby making it possible for a pool-cleaning device (not shown) to be connected to the connection 32, to cover the pool area adequately, without having an excessively long suction pipe between the filter 10 and the pool cleaning device.

Figure 15:
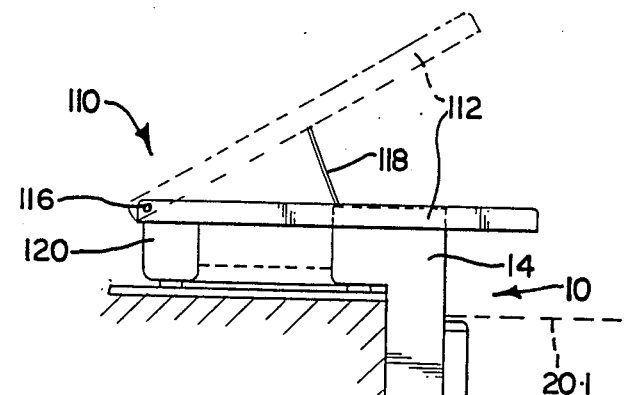
FIG. 15 shows a side elevation of a filter and diving board combination.

Referring to FIG. 15, there is shown a filter and diving board combination 110, made up of a filter 10 and diving board 112 forming a top cover for and extending over and resting on the upper part 14 of the housing 12. The diving board 112 has its end 114 remote from the upper part 14 pivotally mounted about a pivotal axis 116. A stay 118 is provided to maintain the diving board 112 in the open position, shown dotted in FIG. 15. The pivotal axis 116 may be provided by a container 120 which may be used for storing swimming pool chemicals and utensils.

Figure 16:
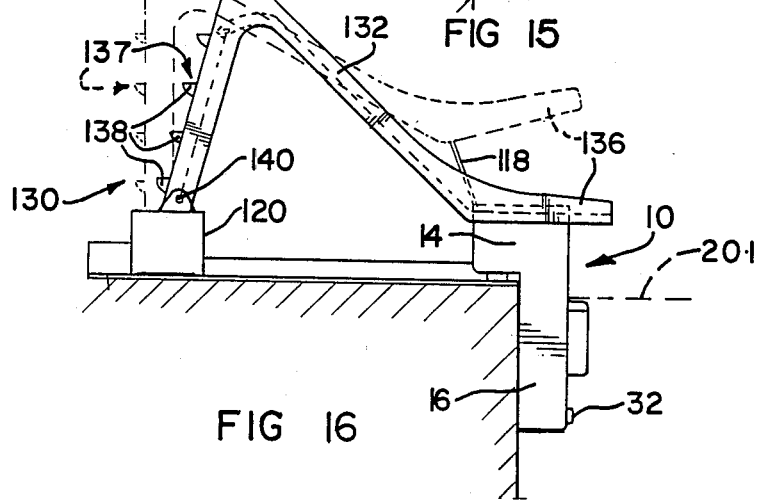
FIG. 16 shows a side elevation of a filter and slide combination.

Referring to FIG. 16, there is shown a filter and slide combination 130 which includes a slide 132 sloping downwardly from a high rear end 134 to a low front end 136. The slide 132 has a step-ladder portion 137 having steps 138 leading up to its high rear end 134. The low front end 136 forms a top cover for and extends over and rests on the upper part 14. The step-ladder portion 137 has a pivotal mounting about a pivotal axis 140 for pivotally supporting the slide to permit it in use to be pivoted and to be supported by stay 118, to uncover the upper part 14.

I claim:

1. A filter which includes a portable housing comprising an upper part which in use is adapted to seat on the edge of a swimming pool having a body of and in which is mounted a pump, a motor drivingly connected to said pump, and a top cover convering the pump and motor; and a lower part which depends from said upper part and contains at least one filter bag having its mouth opening connected to the delivery of the pump, the lower part of the housing having (i) an inlet chamber having an inlet opening, an outlet opening connected to the pump suction, and a sieve upstream from said inlet chamber outlet opening; and (ii) a branch inlet connected to the pump suction, the branch inlet having connecting means for connecting an automatic pool cleaner to the branch inlet; the lower part, when in use and when the upper part is seated on the edge of a pool, being immersible in the body of water of the pool such that the inlet opening of the inlet chamber is submerged.

2. A filter as claimed in claim 1, wherein said top cover is in the form of a diving board extending over and resting on the upper part, the diving board having an end remote from the upper part, and having mounting means for mounting such remote end pivotally to permit the diving board in use to be pivoted to uncover the upper part.

3. A filter as claimed in claim 1, wherein said top cover is in the form of a slide sloping downwardly from a high rear end to a low front end, the slide having a step-ladder portion having steps leading up to its high rear end, and the low front end forming the top cover for and extending over and resting on the upper part, the step-ladder portion having a pivotal mounting for pivotally supporting the slide to permit it in use to be pivoted about its pivotal mounting to uncover the upper part.

4. A filter as claimed in claim 1, in which the filter includes a delivery manifold having an inlet connection connected to the pump delivery; and a plurality of filter bags having their mouth openings connected in parallel to the delivery manifold.

5. A filter as claimed in claim 1, in which the filter includes a plurality of filter bags arranged cascade fashion in series one inside another, the inner bag of the series having its mouth opening connected to the delivery of the pump.

6. A filter as claimed in claim 1, in which that portion of the inlet chamber, downstream from the sieve, has aligned flowstream openings, one of the said aligned flowstream openings being adapted in use to act as an inlet flowstream opening leading into the inlet chamber, and in which there is provided a branch delivery pipe leading from the pump delivery to the said one of the aligned flowstream openings acting as inlet flowstream opening of the inlet chamber, and the other of the said aligned flowstream openings being adapted in use to act as an outlet flowstream opening leading out of the inlet chamber.

7. A filter as claimed in claim 6, in which the housing has a socket connected to the pump suction and a socket connected to the branch delivery pipe, and in which the inlet chamber is detachable from the housing and has a spigot formation at the outlet of the inlet chamber for connection to the socket connected to the pump suction, and has a spigot formation at the inlet flowstream opening for connection to the branch delivery pipe, such spigot formations in use being adapted to fit removably into the said sockets.

* * * * *

UNITED STATES PATENT AND TRADEMARK OFFICE
CERTIFICATE OF CORRECTION

PATENT NO. : 4,749,477
DATED : June 7, 1988
INVENTOR(S) : DUNCAN CLIFT MCGREGOR

It is certified that error appears in the above-identified patent and that said Letters Patent is hereby corrected as shown below:

Column 1, line 6, "swiming" should be -- swimming --.

Column 3, line 28, "The" should begin a new paragraph.

Column 4, line 66, after "of" insert -- water,--.

Signed and Sealed this

Twenty-fourth Day of October, 1989

Attest:

DONALD J. QUIGG

Attesting Officer

Commissioner of Patents and Trademarks